(12) United States Patent
Chen et al.

(10) Patent No.: US 10,481,639 B2
(45) Date of Patent: Nov. 19, 2019

(54) EXPANDABLE SCREEN ASSEMBLY OF MOBILE DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Tsung-Lien Chen, New Taipei (TW); Gui Li, Shenzhen (CN); Da Xu, Shenzhen (CN); Jia-Bin Xiong, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/911,190

(22) Filed: Mar. 5, 2018

(65) Prior Publication Data

US 2019/0235576 A1 Aug. 1, 2019

(30) Foreign Application Priority Data

Jan. 29, 2018 (CN) .......................... 2018 1 0085224

(51) Int. Cl.
*G06F 1/16* (2006.01)
*H04B 1/3827* (2015.01)

(52) U.S. Cl.
CPC .......... *G06F 1/1647* (2013.01); *G06F 1/1675* (2013.01); *H04B 1/3833* (2013.01); *G06F 1/1626* (2013.01)

(58) Field of Classification Search
CPC .... G06F 1/1647; G06F 1/1624; G06F 1/1675; G06F 1/1679; G06F 1/1626; G06F 1/1654; H04M 2250/16; H04M 1/0254; H04M 1/0266; H04B 1/3833; G09G 2300/026
See application file for complete search history.

(56) References Cited

U.S. PATENT DOCUMENTS

2010/0259515 A1* 10/2010 Kohara ................. G06F 1/1624
345/204
2012/0256929 A1* 10/2012 Koenig ................... H04L 12/00
345/503

* cited by examiner

*Primary Examiner* — James Wu
(74) *Attorney, Agent, or Firm* — ScienBiziP, P.C.

(57) ABSTRACT

A screen assembly of a mobile device which can be expanded for a larger viewing area includes a body and a back cover. The body has a main screen and a slot to one side. The back cover is detachably mounted on a rear surface of the body. The back cover has a mounting board with auxiliary screen thereon and an insertion board. The back cover is mounted on the rear surface of the body when the auxiliary screen is not deployed, and the insertion board of the back cover is inserted into the slot of the body when the auxiliary screen is deployed.

9 Claims, 10 Drawing Sheets

EXPANDABLE SCREEN ASSEMBLY OF MOBILE DEVICE

CROSS REFERENCE TO RELATED APPLICATION

This application claims priority to Chinese Patent Application No. 201810085224.5, filed on Jan. 29, 2018, the disclosure of which is incorporated herein by reference in its entirety.

FIELD

The present disclosure relates to display technology in mobile devices, and more particularly to an expandable screen assembly of a mobile device.

BACKGROUND

A mobile device, such as a smartphone, tablet computer, etc., has a screen that allows a user to navigate web pages, watch videos, or perform other activities. However, conventional mobile devices have a fixed size screen such that the size of the screen cannot be varied according to the user's different activities. For example, it may be more convenient to use only a small screen mobile device when the user navigates web pages, but a large screen mobile device would provide a better watching experience when the user watches videos.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

Figure 1:
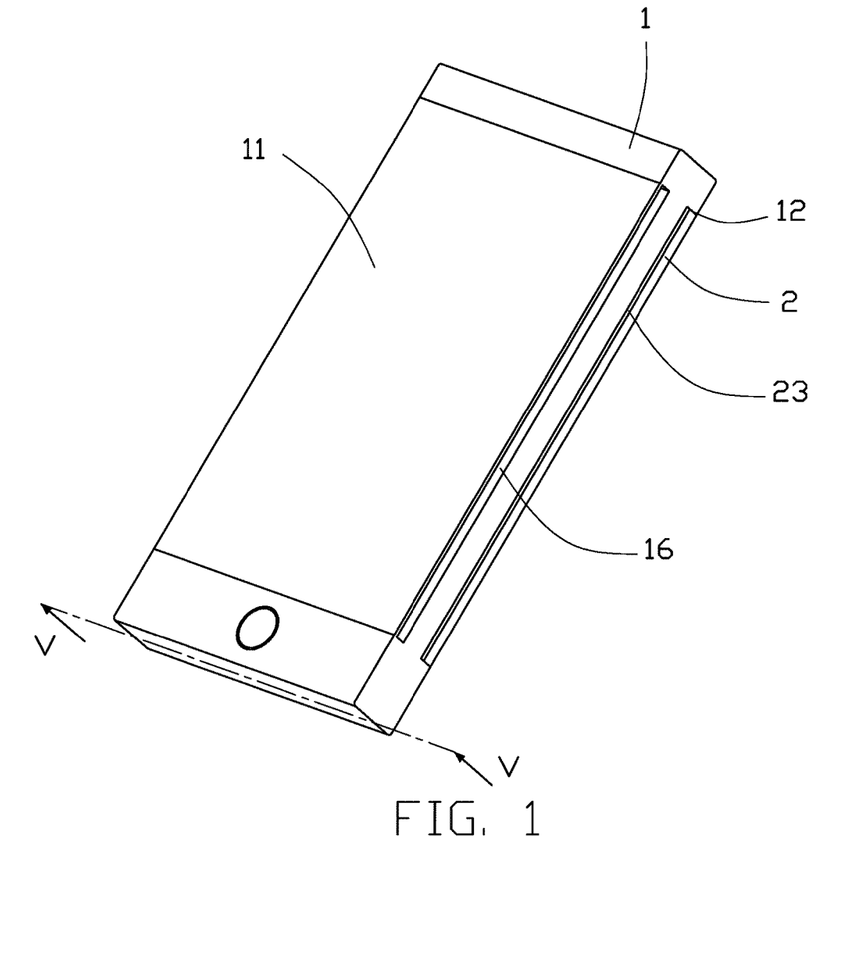
FIG. 1 is a front perspective view of an exemplary embodiment of an expandable screen assembly shown in an unexpanded position.
Figure 2:
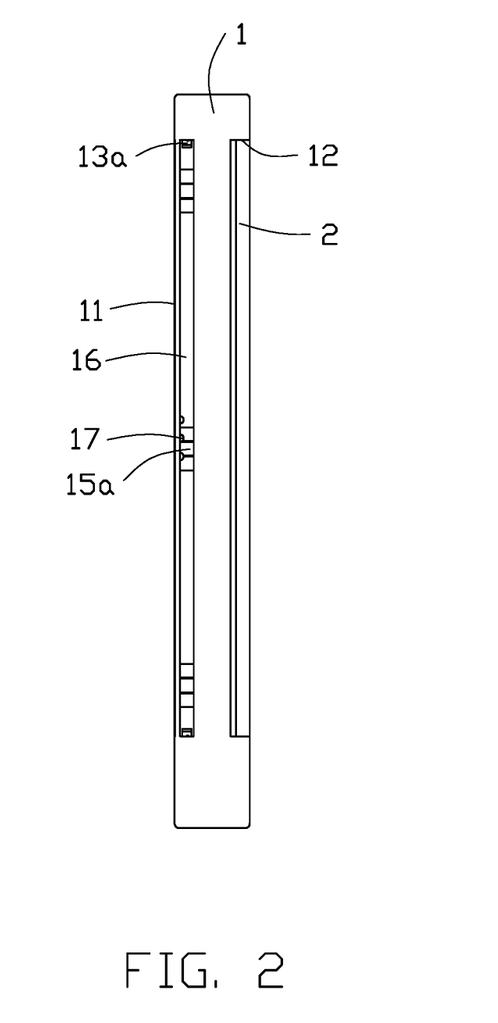
FIG. 2 is a side perspective view of the assembly of FIG. 1 shown in an unexpanded position.

An expandable screen assembly which can be used in a mobile device such as a smartphone, tablet computer, electronic reader, etc. is disclosed. In the present exemplary embodiment, the expandable screen assembly is used in a mobile device. With reference to FIGS. 1 and 2, the expandable screen assembly includes a body 1 and a back cover 2.

Figure 3:
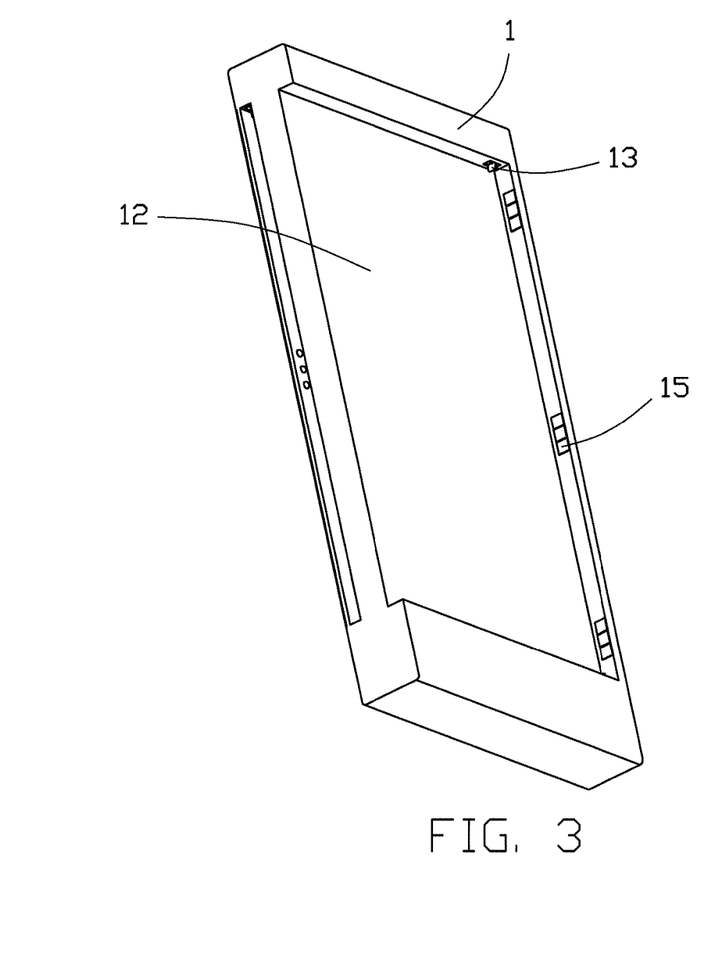
FIG. 3 is a rear perspective view of a body of the assembly of FIG. 1.

With further reference to FIG. 3, the body 1 is rectangular. The body 1 includes a front surface, a rear surface, two side surfaces, a main screen 11, a receiving recess 12, two first pins 13, two second pins 13a, four first springs 14, four second springs 14a, at least one first magnet 15, at least one second magnet 15a, a slot 16, and a first trigger 17. The main screen 11 is located on the front surface of the body 1. The receiving recess 12 is formed in the rear surface of the body 1. The receiving recess 12 has a top surface, a bottom surface, and a side surface.

Figure 5:
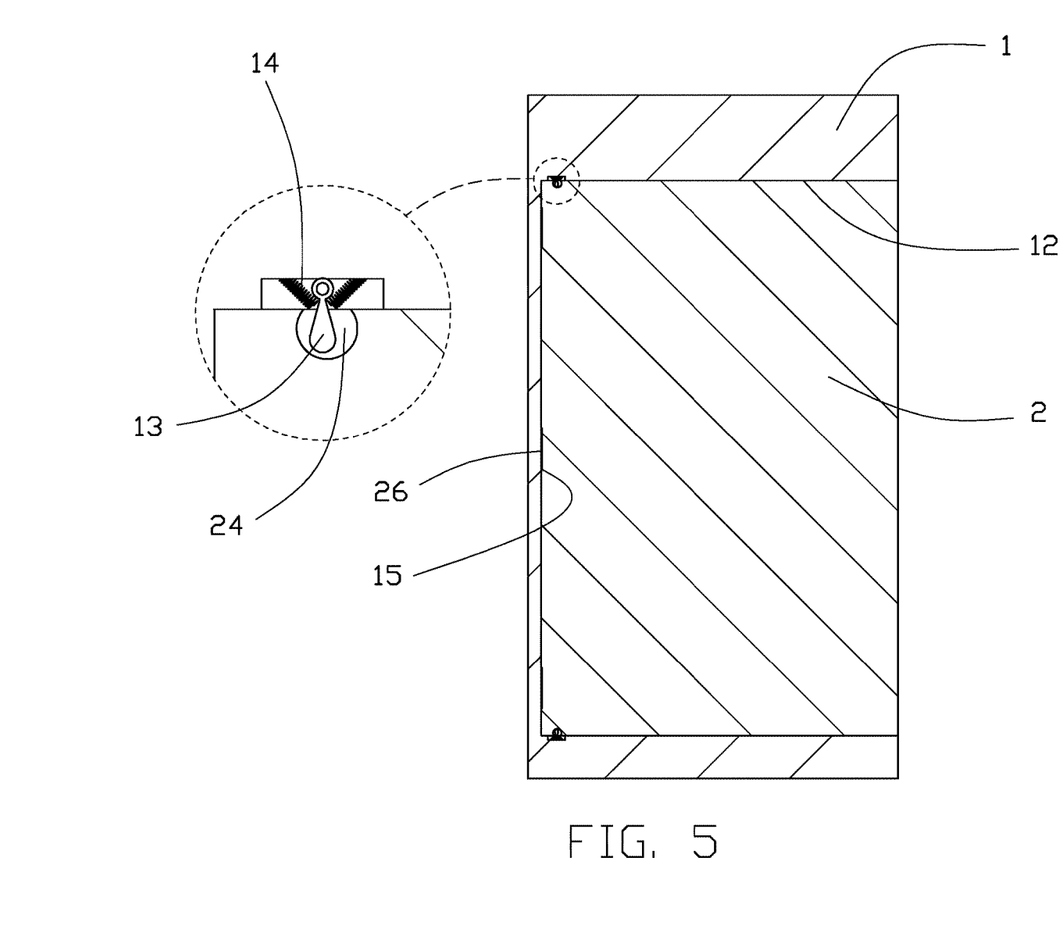
FIG. 5 is a cross-sectional view taken along line V-V of FIG. 1.
Figure 7:
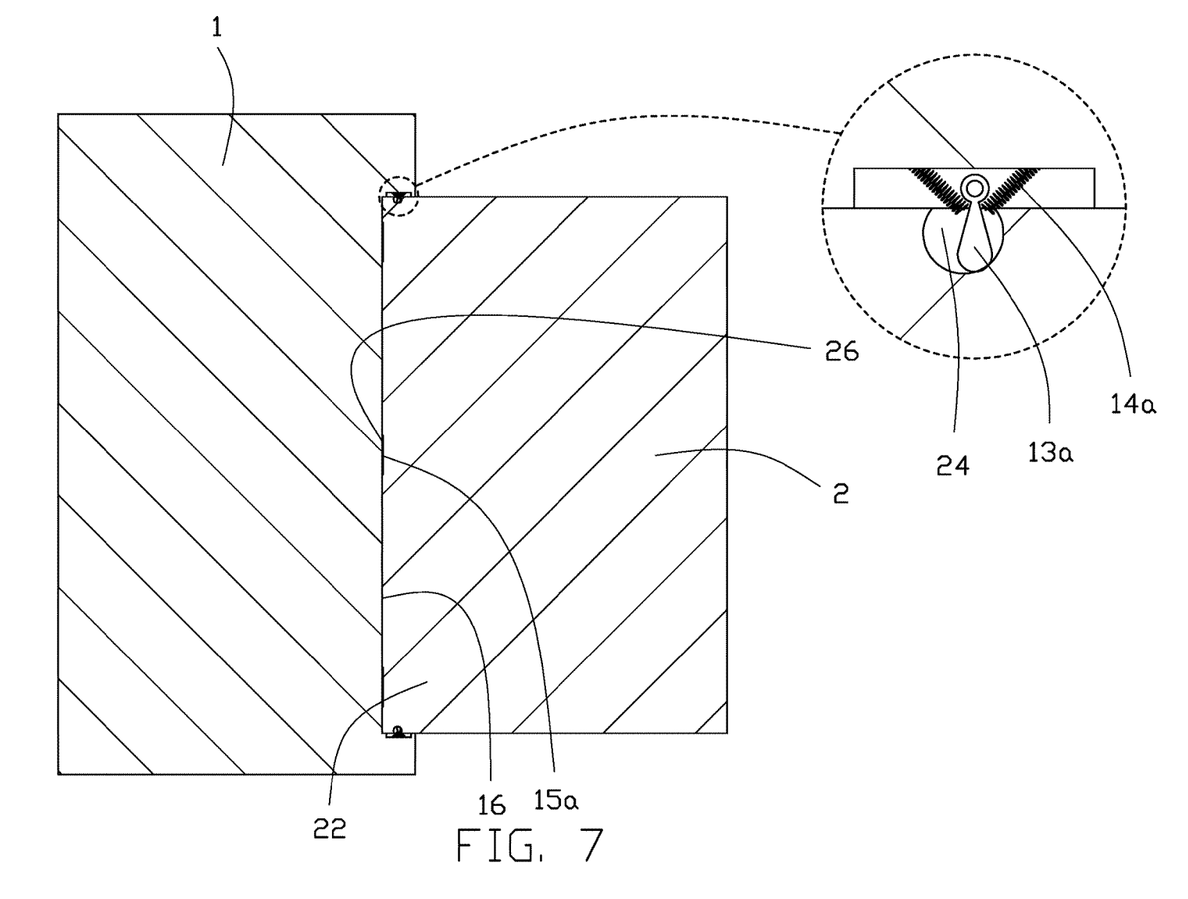
FIG. 7 is a cross-sectional view taken along line VII-VII of FIG. 6.

With reference to FIG. 5, the two first pins 13 are pivotally connected to the top surface and the bottom surface of the receiving recess 12. The first springs 14 are mounted on two sides of one of the first pins 13, the two first springs 14 acting together as a pair in carrying out their function. The first springs 14 provide force to the first pins 13 such that the first pins 13 protrude into the receiving recess 12. The first magnet 15 is embedded in the side surface of the receiving recess 12. With reference to FIG. 2, the slot 16 is formed in one of the side surfaces of the body 1. The slot 16 has a top surface, a bottom surface, a side surface, and a front surface. With reference to FIG. 7, the two second pins 13a are pivotally connected to the top surface and the bottom surface of the slot 16. The second springs 14a are mounted on two sides of one of the second pins 13a, the two second springs 14a acting together as a pair in carrying out their function. The second springs 14a provide force to the second pins 13a such that the second pins 13a protrude into the slot 16. The second magnet 15a is embedded in the side surface of the slot 16. The first trigger 17 is mounted on the center of the front surface of the slot 16. In the present exemplary embodiment, three spaced first magnets 15 are embedded in the side surface of the receiving recess 12, three spaced second magnets 15a are embedded in the side surface of the slot 16, and the first trigger 17 has three contact points.

Figure 4:
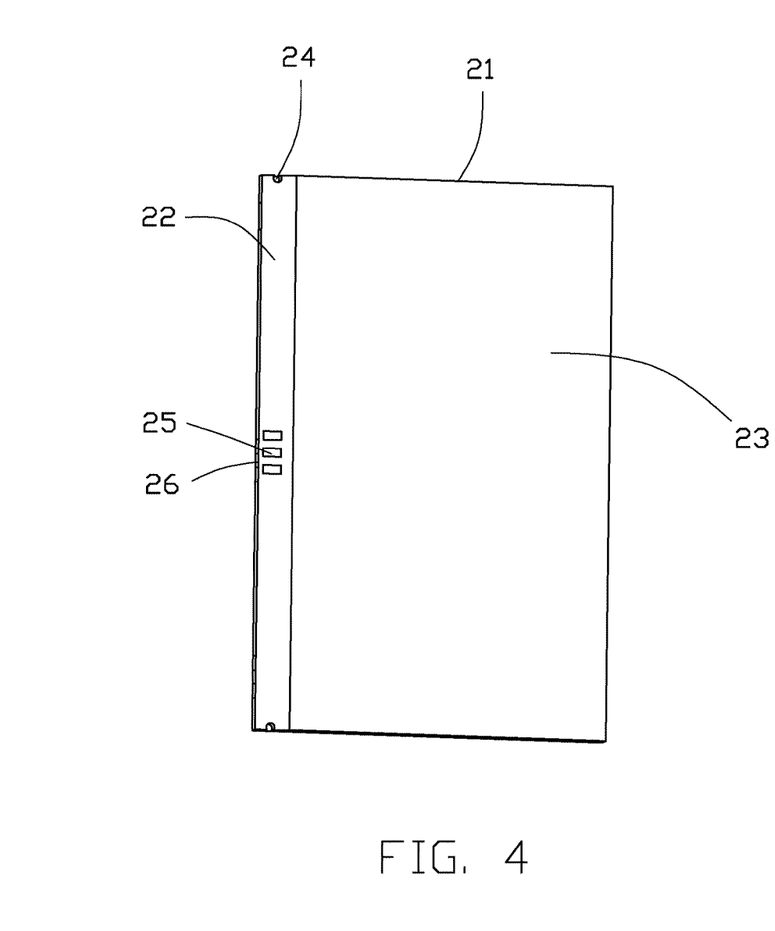
FIG. 4 is a front perspective view of a back cover of the assembly of FIG. 1.

The back cover 2 is detachably disposed in the receiving recess 12 of the body 1. With reference to FIG. 4, the back cover 2 includes a mounting board 21, an insertion board 22, an auxiliary screen 23, two notches 24, a second trigger 25, and at least one magnet 26. The mounting board 21 has a front surface and a rear surface. The insertion board 22 has a front surface, a rear surface, and a side surface. The auxiliary screen 23 is located on the front surface of the mounting board 21. The two notches 24 are formed in the top and bottom of the front surface of the insertion board 22. The second trigger 25 is mounted on the center of the front surface of the insertion board 22. The magnet 26 is embedded in the side surface of the insertion board 22. In the present exemplary embodiment, the second trigger 25 has three contact recesses, and three spaced third magnets 26 are embedded in the side surface of the insertion board 22.

Figure 6:
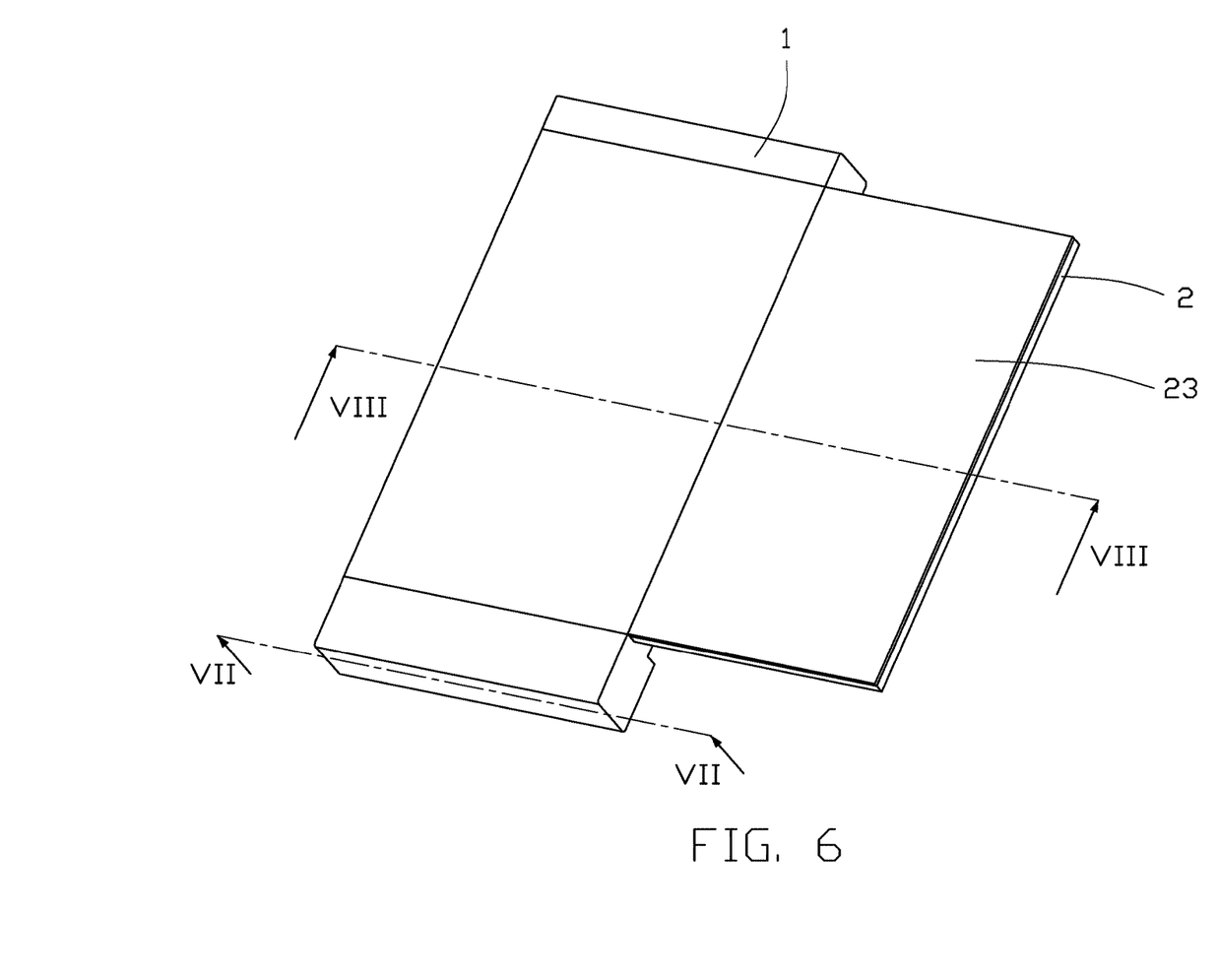
FIG. 6 is a front perspective view of the assembly of FIG. 1 shown in an expanded position.
Figure 8:
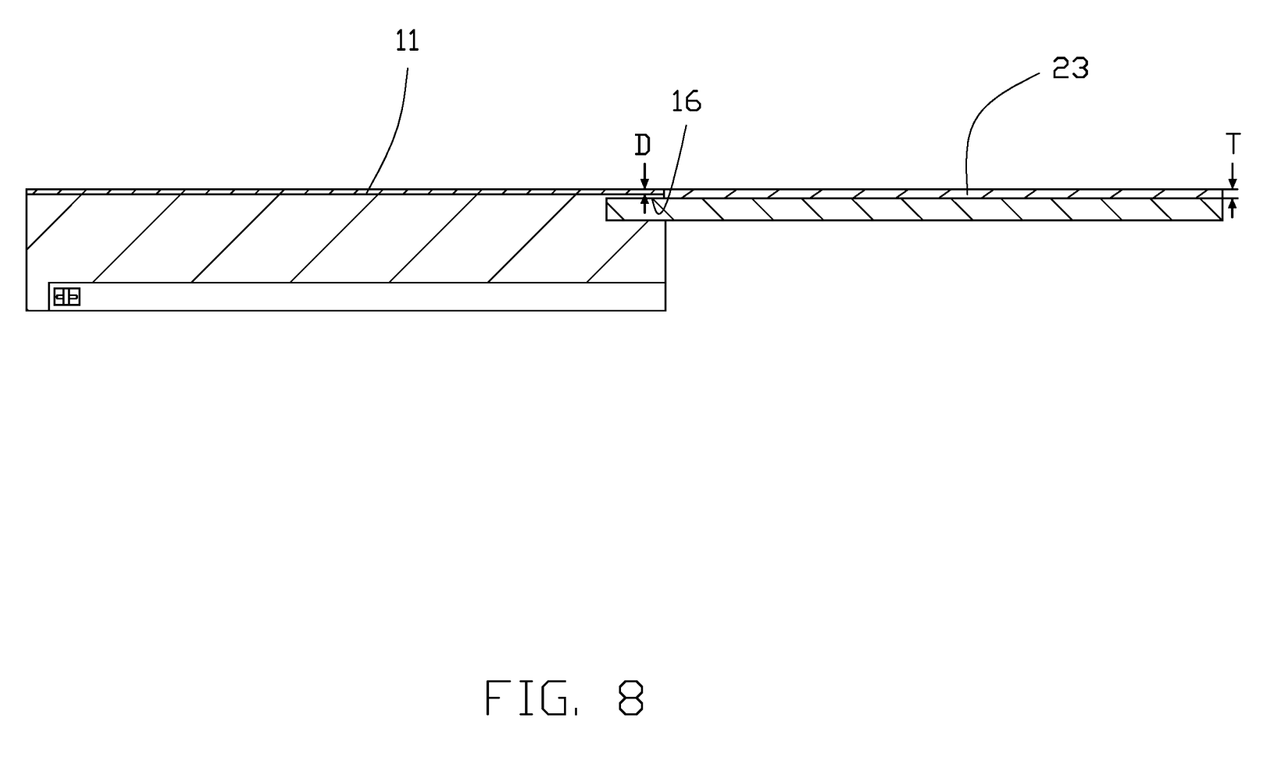
FIG. 8 is a cross-sectional view taken along line VIII-VIII of FIG. 6.

With reference to FIGS. 1 and 5, the back cover 2 is disposed in the receiving recess 12 of the body 1 when the auxiliary screen 23 is in an unexpanded position. In the unexpanded position, the first pins 13 of the body 1 engage the notches 24 of the back cover 2, and the first magnet 15 of the body 1 attracts the magnet 26 of the back cover 2. With reference to FIGS. 6 and 7, the insertion board 22 of the back cover 2 is inserted into the slot 16 of the body 1 when the auxiliary screen 23 is in an expanded position. In the expanded position, the second pins 13*a* of the body 1 engage the notches 24 of the back cover 2, the second magnet 15*a* of the body 1 attracts the magnet 26 of the back cover 2, and the second trigger 25 of the back cover 2 is connected to the first trigger 17 of the body 1 to activate the auxiliary screen 23. With reference to FIG. 8, a thickness T of the auxiliary screen 23 is substantially equal to a distance D from the front surface of the main screen 11 to the slot 16, so as to ensure that the auxiliary screen 23 and the main screen 11 have a tolerance to be considered as located on the same plane or perceived as flat when in the expanded position. In addition, a dust plug (not shown) can be inserted into the slot 16 of the body 1 when in the unexpanded position.

Figure 9:
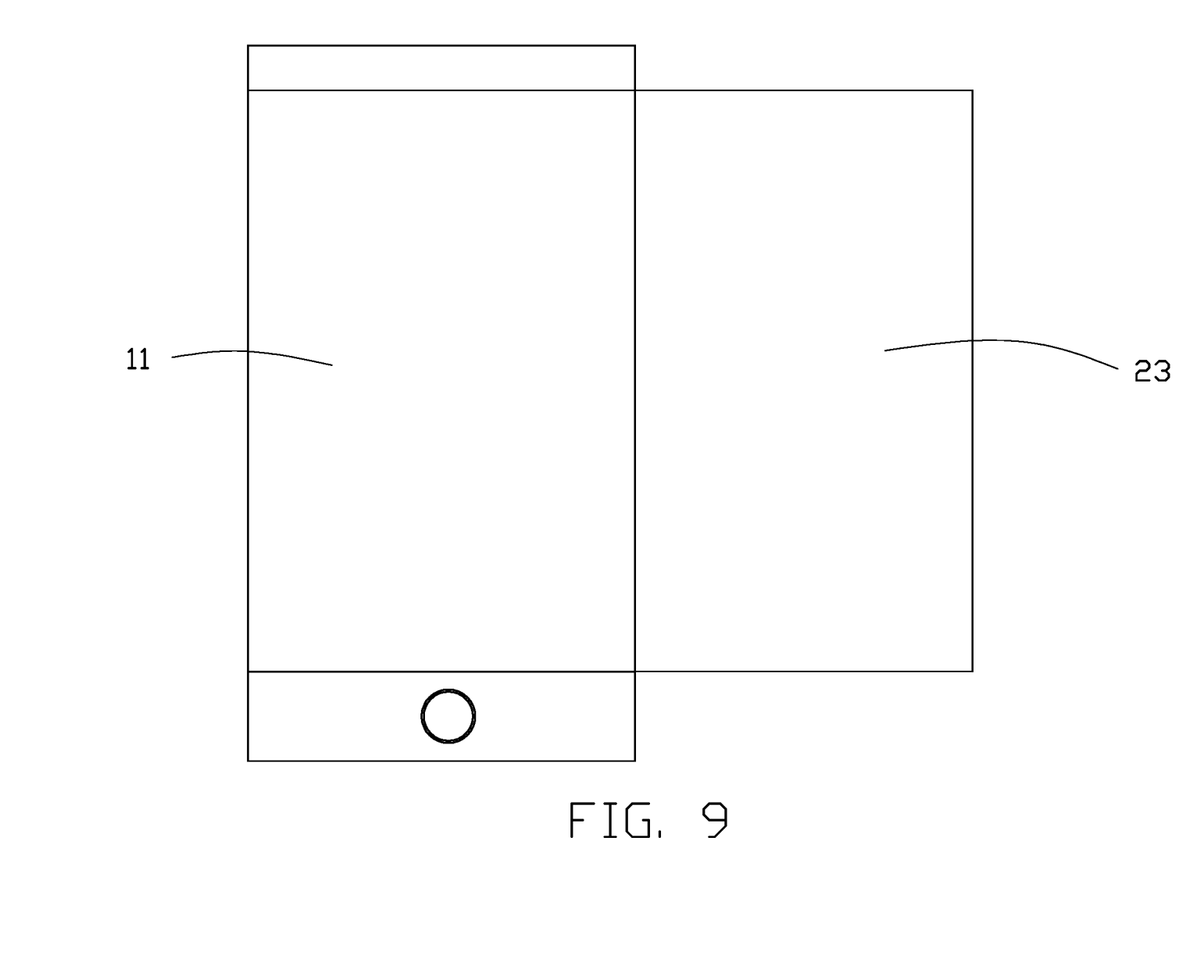
FIG. 9 is a front view of the assembly of FIG. 1 shown in an expanded position.
Figure 10:
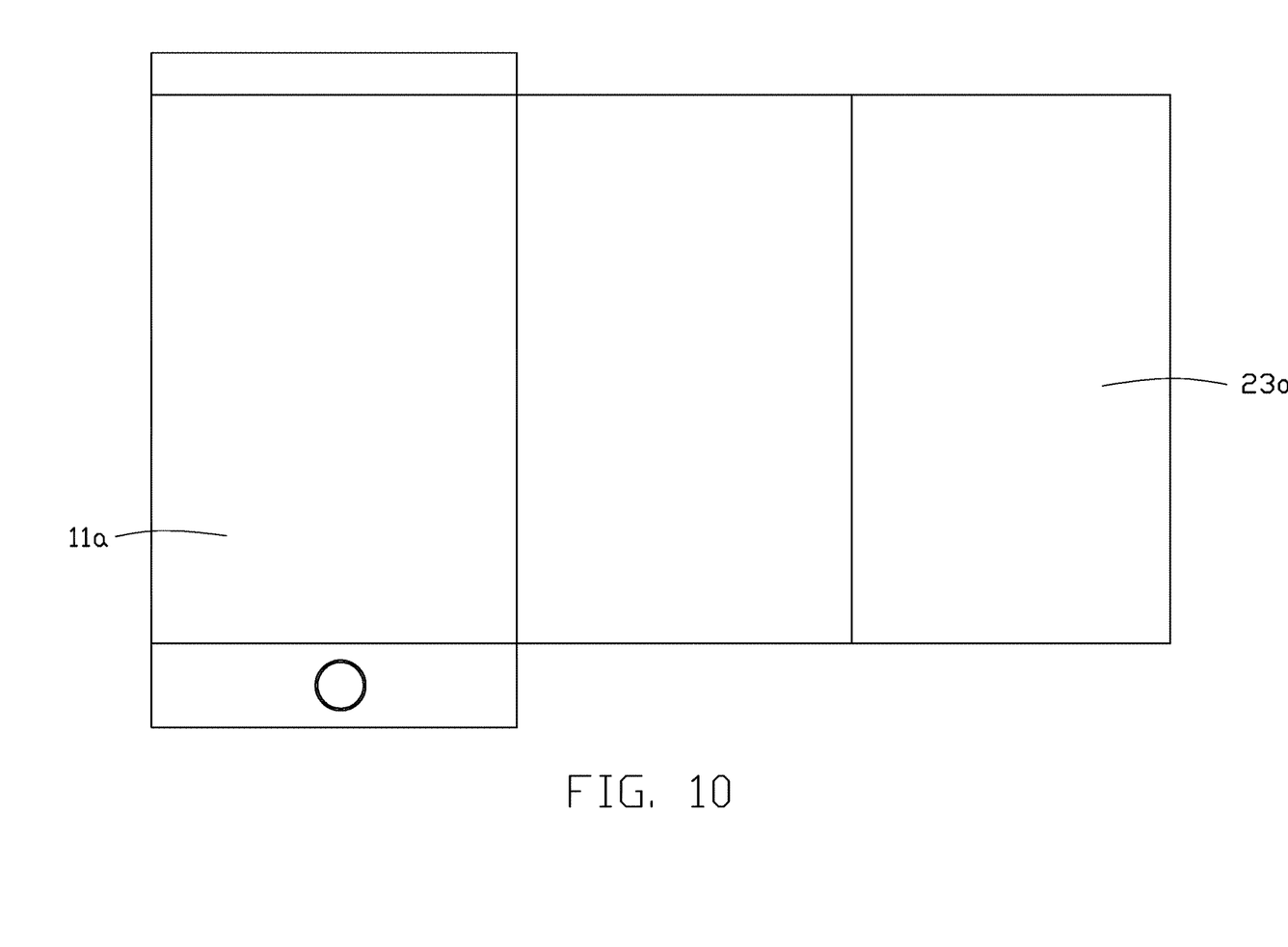
FIG. 10 is a front view of another exemplary embodiment of an expandable screen assembly shown in an expanded position.

With reference to FIG. 9, the main screen 11 has an aspect ratio of approximately 3:2. The auxiliary screen 23 can be designed to have different widths to achieve different screen aspect ratios. In the present exemplary embodiment, the aspect ratio of the main screen 11 and the auxiliary screen 23 together is approximately 4:5. With reference to FIG. 10, in another exemplary embodiment, the aspect ratio of the main screen 11*a* and the auxiliary screen 23*a* together is approximately 9:16, and the auxiliary screen 23*a* can be folded for storage.

The back cover 2 with the auxiliary screen 23 is detachable such that a user can vary the size of the screen according to the needs of the user to achieve the best user experience. For example, the back cover 2 can be disposed in the receiving recess 12 of the body 1 to switch the mobile device into the single screen mode when the user wants to use a small screen mobile device to easily navigate web pages. The insertion board 22 of the back cover 2 can be inserted into the slot 16 of the body 1 to switch the mobile device into the dual screen mode when the user wants to use a large screen mobile device to watch videos to have a better watching experience.

The exemplary embodiments shown and described above are only examples. Many details are often found in the art such as the other features of a mobile device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An expandable screen assembly of a mobile device, the expandable screen assembly comprising:
 a body having:
  a main screen located on a front surface of the body;
  a slot formed in a side surface of the body; and
  a first trigger mounted in the slot, and defining at least one contact point; and
 a back cover detachably mounted on a rear surface of the body, and the back cover having:
  a mounting board;
  an insertion board;
  an auxiliary screen located on a front surface of the mounting board; and
  a second trigger mounted on the insertion board, and defining at least one contact recess;
 wherein when the auxiliary screen is in an unexpanded position, the back cover is mounted on the rear surface of the body;
 wherein when the auxiliary screen is in an expanded position, the insertion board of the back cover is inserted into the slot of the body and the second trigger of the back cover is connected to the first trigger of the body;
 wherein a receiving recess is formed in the rear surface of the body, and the back cover is detachably disposed in the receiving recess;
 wherein the back cover has a notch formed in the insertion board;
 wherein the body comprises:
  a first pin pivotally connected in the receiving recess; and
  two first springs mounted on two sides of the first pin, respectively; and
 wherein the first springs elastically press the first pin into the receiving recess of the body, and the first pin of the body engages the notch of the back cover when the back cover is disposed in the receiving recess of the body.

2. The expandable screen assembly of claim 1,
 wherein the back cover has a notch formed in the insertion board;
 wherein the body has:
  a second pin pivotally connected in the slot; and
  two second springs mounted on two sides of the second pin; and
 wherein the second springs provide force to the second pin such that the second pin protrudes into the slot of the body, and the second pin of the body engages the notch of the back cover when the insertion board of the back cover is inserted into the slot of the body.

3. The expandable screen assembly of claim 1,
 wherein the body has:
  a second pin pivotally connected in the slot; and
  two second springs mounted on two sides of the second pin; and
 wherein the second springs provide force to the second pin such that the second pin protrudes into the slot of the body, and the second pin of the body engages the notch of the back cover when the insertion board of the back cover is inserted into the slot of the body.

4. The expandable screen assembly of claim 3,
 wherein the body has a first magnet mounted in the receiving recess;
 wherein the back cover has a magnet mounted in the insertion board; and
 wherein the first magnet of the body attracts the magnet of the back cover when the back cover is disposed in the receiving recess of the body.

5. The expandable screen assembly of claim 4,
wherein the body has a second magnet mounted in the slot; and
wherein the second magnet of the body attracts the magnet of the back cover when the insertion board of the back cover is inserted into the slot of the body.

6. The expandable screen assembly of claim 1,
wherein the body has a first magnet mounted in the receiving recess;
wherein the back cover has a magnet mounted in the insertion board; and
wherein the first magnet of the body attracts the magnet of the back cover when the back cover is disposed in the receiving recess of the body.

7. The expandable screen assembly of claim 6,
wherein the body has a second magnet mounted in the slot; and
wherein the second magnet of the body attracts the magnet of the back cover when the insertion board of the back cover is inserted into the slot of the body.

8. The expandable screen assembly of claim 1,
wherein the body has a magnet mounted in the slot;
wherein the back cover has a magnet mounted in the insertion board; and
wherein the magnet of the body attracts the magnet of the back cover when the insertion board of the back cover is inserted into the slot of the body.

9. The expandable screen assembly of claim 1, wherein a thickness of the auxiliary screen is substantially equal to a distance from a front surface of the main screen to the slot such that the auxiliary screen and the main screen are located in the same plane when the insertion board of the back cover is inserted into the slot of the body.

* * * * *